United States Patent [19]

Sasaki et al.

[11] Patent Number: 5,113,309
[45] Date of Patent: May 12, 1992

[54] HIGH-VOLTAGE THROUGH-TYPE CERAMIC CAPACITOR

[75] Inventors: Setsuo Sasaki, Nikahomachi; Teruo Taguchi, Honjou; Isao Fujiwara, Nikahomachi, all of Japan

[73] Assignee: TDK Corporation, Tokyo, Japan

[21] Appl. No.: 722,019

[22] Filed: Jun. 27, 1991

Related U.S. Application Data

[62] Division of Ser. No. 360,521, Jun. 2, 1989, Pat. No. 5,032,949.

[30] Foreign Application Priority Data

Jun. 7, 1988 [JP]  Japan .................. 63-74739[U]
Aug. 22, 1988 [JP] Japan ................ 63-109046[U]
Aug. 22, 1988 [JP] Japan ................ 63-109047[U]

[51] Int. Cl.$^5$ ............................................. H01G 4/42
[52] U.S. Cl. ............................... 361/302; 361/330
[58] Field of Search .................. 361/302, 330, 540; 174/52 PE

[56]       References Cited
        U.S. PATENT DOCUMENTS 3,806,770  4/1974  Voyles et al. ............. 174/52 PE
4,370,698  1/1983  Sasaki ........................ 361/330
4,558,399 12/1985  Toyama et al. .............. 361/540
4,768,129  8/1988  Sasaki et al. ................ 361/302
4,811,161  3/1989  Sasaki et al. ................ 361/302
4,814,938  3/1989  Arakawa et al. ............. 361/302

FOREIGN PATENT DOCUMENTS 965757  6/1957  Fed. Rep. of Germany .

Primary Examiner—Donald A. Griffin
Attorney, Agent, or Firm—Price, Gess & Ubell

[57] ABSTRACT

A high-voltage through-type ceramic capacitor which is capable of exhibiting satisfactory heat resistance sufficient to ensure good operability of the capacitor even under severe conditions and being positively small-sized while ensuring its satisfactory operation. In the capacitor, at least one of an insulation case and an insulation cover is made of a material selected from the group consisting of polyethylene terephthalate and nylon 66. The capacitor further includes a pair of central conductors each including a fastening tab arranged in the insulation case, and the insulation case is formed at an upper portion thereof surrounding the fastening tabs into an upper enlarged section.

9 Claims, 14 Drawing Sheets

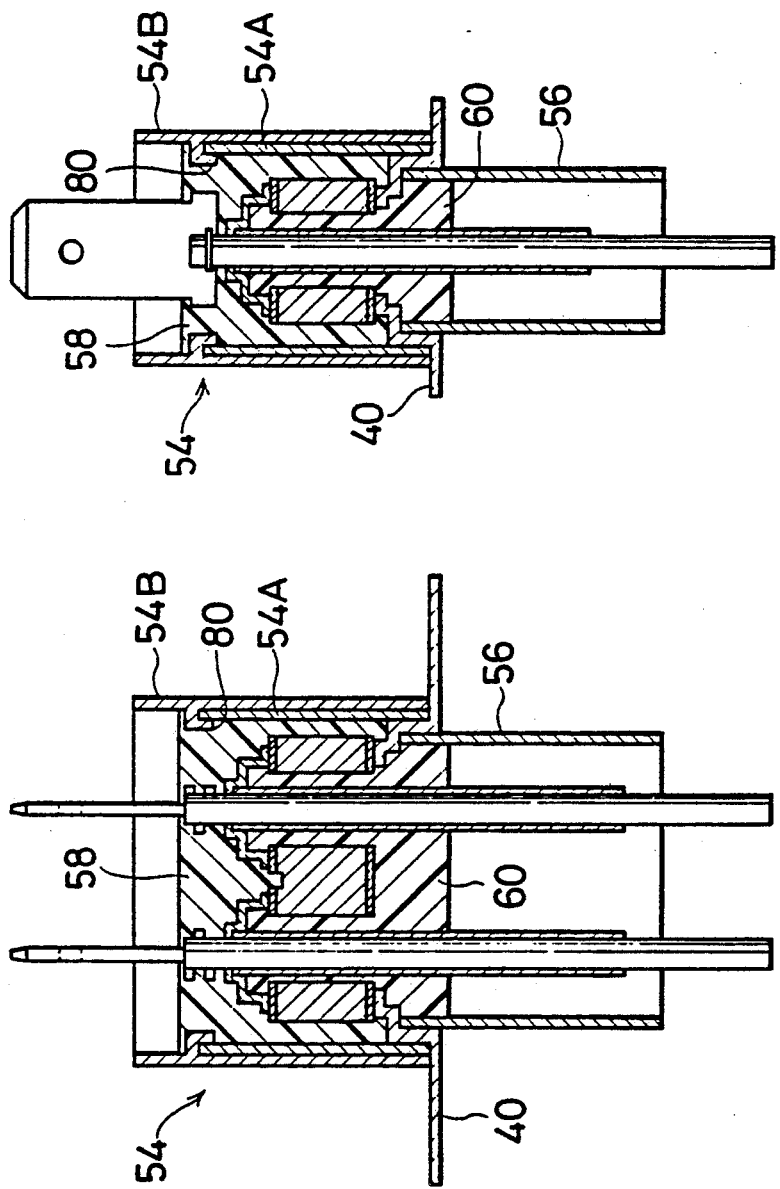

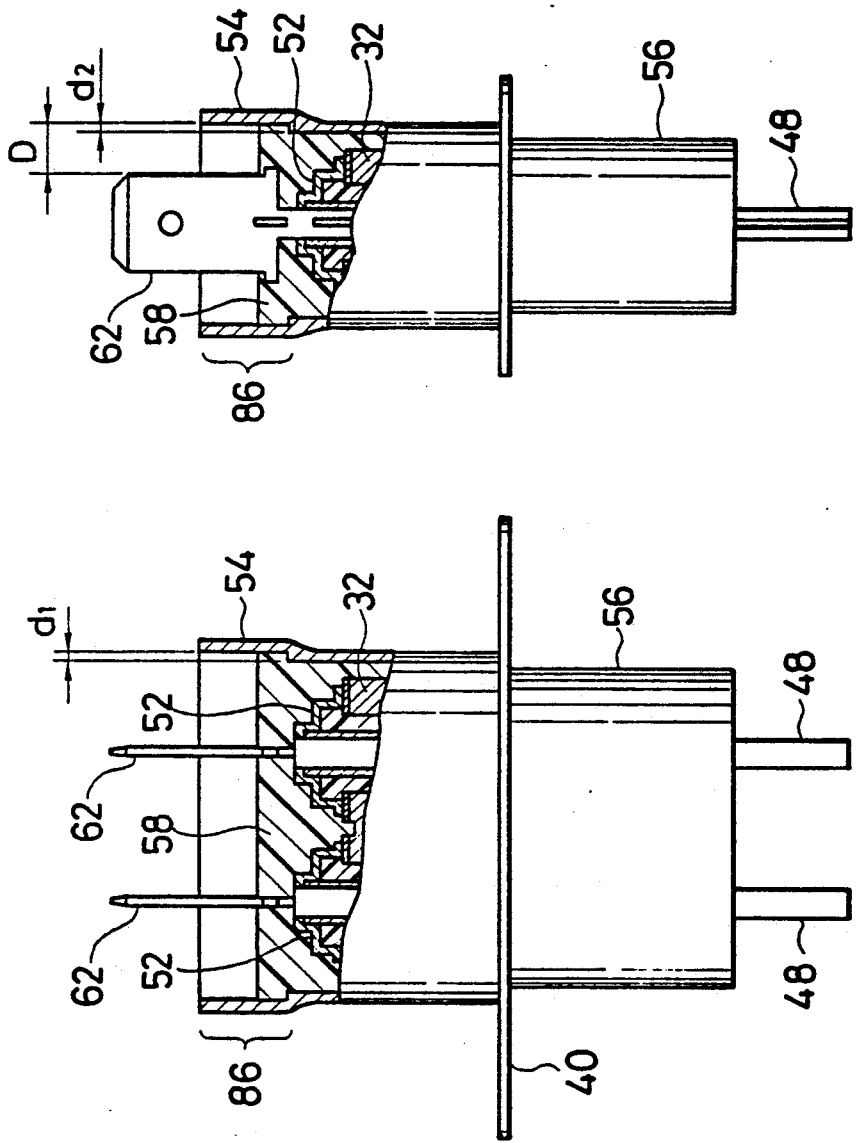

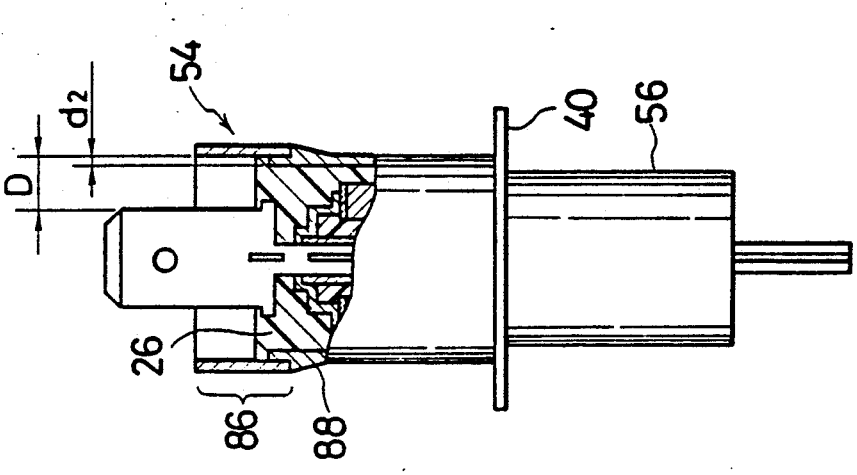
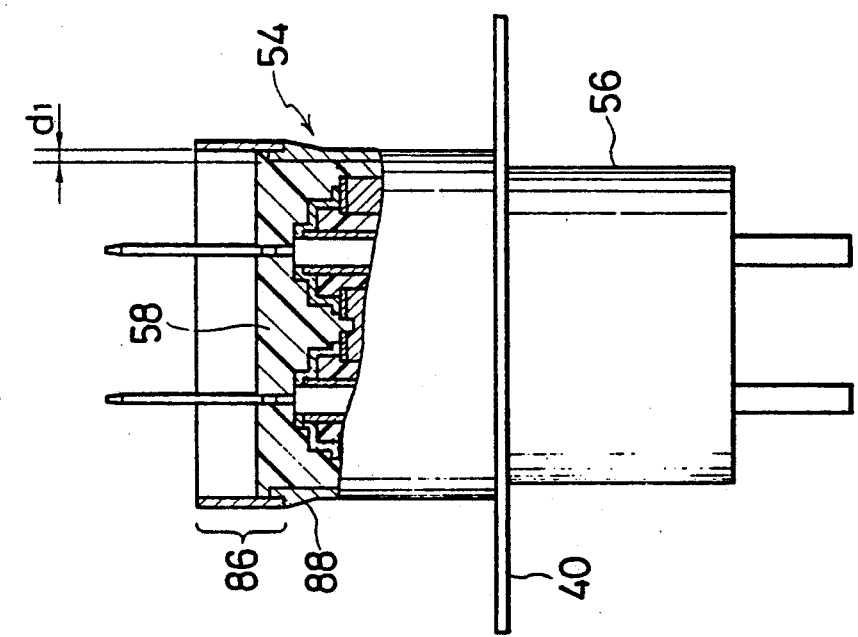

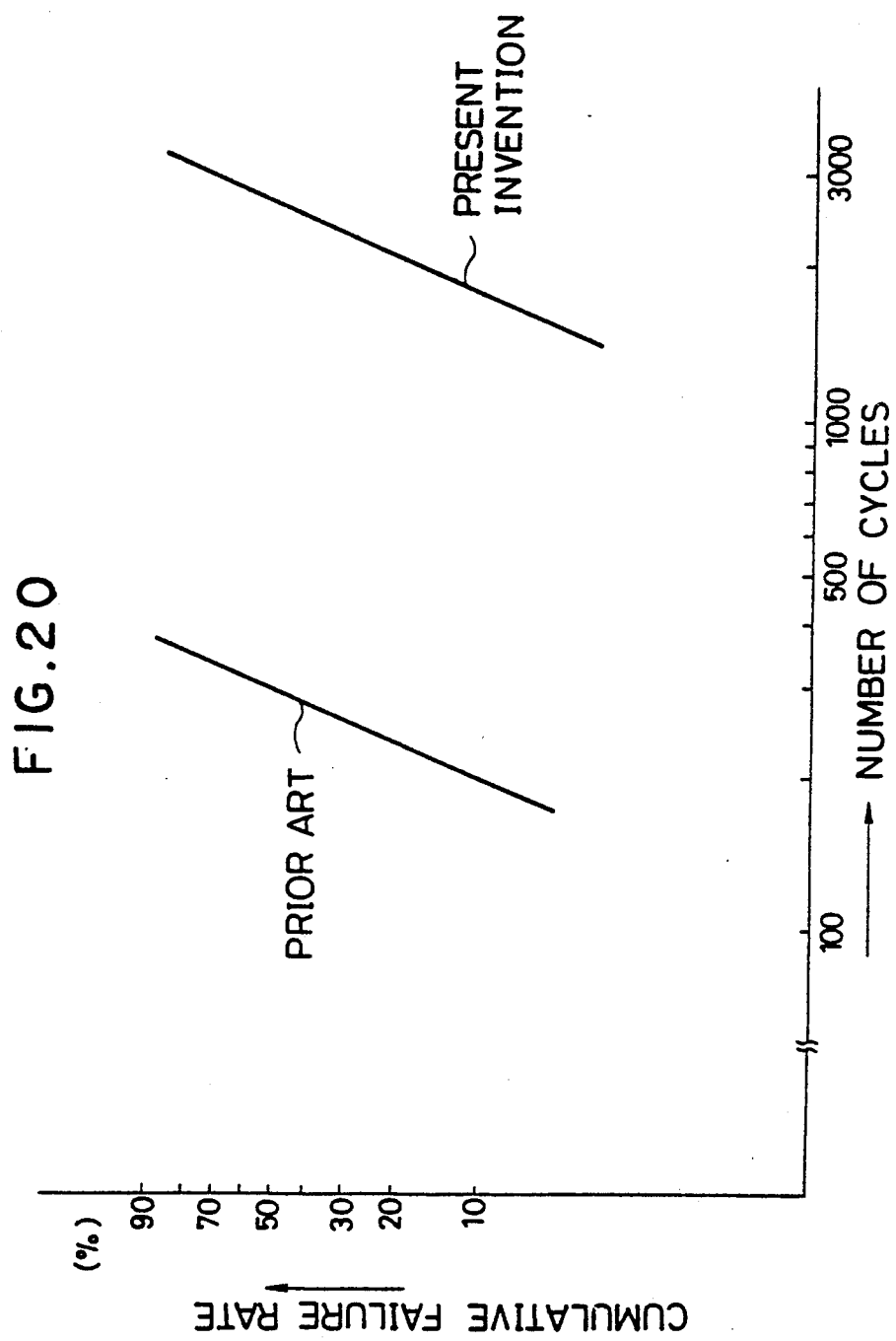

HIGH-VOLTAGE THROUGH-TYPE CERAMIC CAPACITOR

RELATED APPLICATIONS

This is a divisional application of U.S. Pat. Ser. No. 360,521, filed June 2, 1989 now U.S. Pat. No. 5,032,949 issued on July 16, 1991.

BACKGROUND OF THE INVENTION

1. Field of the Invention

This invention relates to a high-voltage through-type ceramic capacitor, and more particularly to a high-voltage through-type ceramic capacitor for a magnetron used in an electronic range or oven or the like.

2. Description of the Prior Art

A high-voltage through-type ceramic capacitor has been generally used as a filter capacitor for a magnetron tube for an electronic oven or the like.

When an electronic oven is driven for a long period of time or subjected to a no-load test, heat generated from a heater circuit of a magnetron is transmitted through an aluminum stem and choke coils to central conductors of a capacitor. Recently, a magnetron tube is highly small-sized and correspondingly a filter box is small-sized. This causes a distance between the aluminum stem (heater side) and the central conductors of the capacitor to be reduced. Also, a measure to counter a fifth higher harmonic for satellite broadcasting causes the filter box to be free of any vacancy or hole to enhance a shielding effect of the filter box. Thus, an increase in temperature within the filter box is further promoted.

In general, a conventional high-voltage through-type ceramic capacitor includes an insulation case and an insulation cover, between which a ground fitment is fittedly arranged. In the insulation case is arranged a ceramic dielectric, of which earth electrode means is connected to the ground fitment. In the insulation case is poured an insulating resin material so as to surround the ceramic dielectric.

Now, such a conventional high-voltage through-type ceramic capacitor will be described more detailedly with reference to FIGS. 1 to 4.

A conventional high-voltage through-type ceramic capacitor which is generally designated by reference numeral 30 in FIGS. 1 to 4 includes a ceramic dielectric 32, which is formed with a pair of vertically extending through-holes 34 in a manner to be substantially parallel with each other. Also, the ceramic dielectric 32 is provided on an upper surface thereof with a pair of capacitor electrodes 36, which are separated from each other, and on a lower surface thereof with a common capacitor electrode 38. These separate electrodes 36 and common electrode 38 are formed with through-holes corresponding to the through-holes 34 of the ceramic dielectric 32, respectively. The capacitor 30 also includes a ground plate or fitment 40 formed at a central portion thereof with an opening 42 and provided on one surface thereof with an upstand 44 of a suitable height, which is arranged so as to surround the central opening 42. The ceramic dielectric 32 is fixed through the common electrode 38 on the upstand 44 of the ground fitment 40 using suitable means such as soldering or the like.

Further the through-type ceramic capacitor 30 includes a pair of central conductors 46 each including a conductor body 48 which is adapted to be covered with an insulation tube 50 formed of a suitable insulating material such as silicone. The insulation tubes 50 are inserted via the through-holes 34 of the ceramic dielectric 32 and the opening 42 of the ground fitment 40 and the conductor bodies 48 each are fittedly secured in an electrode connector or fitment 52 fixed on each of the separate electrodes 46 by soldering or the like.

The through-type ceramic capacitor 30 further includes an insulation case 54 securely fitted at a lower portion thereof on the upstand 44 of the ground fitment 40 so as to surround the ceramic dielectric 32 and an insulation cover 56 securely fitted at an upper end thereof in the upstand 44 of the ground fitment 40 so as to surround the central conductors 46. The insulation case 54 and insulation cover 56 are filled with insulation resin materials 58 and 60 such as epoxy resin or the like to cover an outside and inside of the ceramic dielectric with the resins or embed it therein, to thereby ensure insulation properties of the ceramic dielectric.

Each of the central conductors 46 further includes a fastening tab 62 integrally provided on an upper end of the conductor body 48 received in the insulation case 54, which is arranged in such a manner that it may be projected from an upper end of the insulation case 54 so as to facilitate connection of an external connector thereto.

The insulation case 54 and insulation cover 56 each are conventionally made of a polybutylene terephthalate (PBT) resin material.

The so-constructed high-voltage through-type ceramic capacitor is used in such a manner that the ground fitment 40 is mounted on a side wall of a filter box, resulting in the insulation cover 56 being positioned on an inside of the filter box. A temperature in the filter box is often increased to as high as 230° C. during operation of an electronic oven for such purposes as described above. The insulation cover 56, as described above, is formed of a polybutylene terephthalate (PBT) resin material having a melting point of about 225° to 228° C. Accordingly, the insulation cover hangs down due to softening and/or melting by heat from the filter box to lead to contacting with a high voltage lead wire, resulting in an insulation failure.

Also, the ceramic capacitor tends to be small-sized corresponding to miniaturization of the magnetron tube and filter box described above. For this purpose, it is required to decrease dimensions of the insulation case. However, dimensions of the fastening tab and a receptacle fitted thereon are determined depending on a current capacity of a magnetron heater circuit, leading to a failure in miniaturization of the fastening tab and receptacle.

Now, a disadvantage due to a failure in miniaturization of the fastening tab and receptacle irrespective of miniaturization of the insulation case will be described with reference to FIG. 4. The failure results in an interval between the insulation case 54 and the central conductors 46 being substantially reduced. This, when a receptacle 64 is fitted on each of the fastening tabs 62, causes an outer wall 66 of the receptacle 64 to tend to strike against an upper end of the insulation case 54, resulting in fitting of the receptacle on the fastening tab 62 being often failed.

Also, miniaturization of only the insulation case 54 decreases a distance between the insulation case and the receptacles to lead to discharge between the receptacles 64 and the ground fitment 40, resulting in the burning and insulation failure of the components.

Further, it is desired that the insulation case 54 is made of a thermosetting resin material in view of its dielectric strength. Unfortunately, the thermosetting resin exhibits excessive adhesion to the insulating resin materials 58 and 60 poured in the case 54 to lead to a failure in exhibiting satisfactory dielectric strength. Thus, the conventional ceramic capacitor renders use of a thermosetting resin material for this purpose impossible.

Accordingly, it would be highly desirable to develop a high-voltage through-type ceramic capacitor which is capable of exhibiting satisfactory heat resistance sufficient to ensure good operability of the capacitor even under severe conditions and being positively small-sized while ensuring its satisfactory performance.

SUMMARY OF THE INVENTION

In accordance with the present invention, a high-voltage through-type ceramic capacitor is provided. The high-voltage through-type ceramic capacitor includes an insulation case and an insulation cover arranged at an outer periphery of the capacitor. At least one of the insulation case and insulation cover is made of a material selected from the group consisting of polyethylene terephthalate and nylon 66. The ceramic capacitor may further include a pair of central conductors each including a fastening tab arranged in the insulation case, and the insulation case is formed at a portion thereof surrounding the fastening tabs into an enlarged section.

In accordance with another aspect of the present invention, a high-voltage through-type ceramic capacitor is provided which comprises an insulation case, an insulation cover, a ground fitment interposedly arranged between the insulation case and the insulation cover, a ceramic dielectric having earth electrode means connected to the ground fitment, a pair of central conductors each including a fastening tab arranged in the insulation case, and an insulating resin material poured in said insulation case so as to surround the ceramic dielectric. The insulation case is formed at a portion thereof surrounding the fastening tabs into an enlarged section.

In accordance with another aspect of the present invention, a high-voltage through-type ceramic capacitor is provided which comprises an insulation case, an insulation cover, a ground fitment interposedly arranged between the insulation case and the insulation cover, a ceramic dielectric having earth electrode means connected to the ground fitment, and an insulating resin material poured in the insulation case so as to surround the ceramic dielectric. The insulation case comprises an inner case member and an outer case member fitted on the inner case member. The inner case member is formed into a height smaller than that of the outer case member and fitted in the outer case member in such a manner that an upper end of the inner case member terminates below an upper end of the outer case member. The inner case member is made of a thermoplastic resin material and the outer case member is made of a thermosetting resin material.

In accordance with a further aspect of the present invention, a high-voltage through-type ceramic capacitor is provided which comprises an insulation case, an insulation cover, a ground fitment interposedly arranged between the insulation case and the insulation cover, a ceramic dielectric having earth electrode means connected to the ground fitment, and an insulating resin material poured in the insulation case so as to surround the ceramic dielectric. The insulation case comprises an upper case member of a larger diameter for constituting an enlarged section and a lower case member of a smaller diameter which are separately formed and connected in such a manner that a lower end portion of the upper case member and an upper end portion of the lower case member are fitted together. The upper case member is made of a thermosetting resin material and the lower case member is made of a thermoplastic resin material.

Accordingly, it is an object of the present invention to provide a high-voltage through-type ceramic capacitor which is capable of exhibiting satisfactory heat resistance sufficient to ensure good operability of the capacitor even under severe conditions.

It is another object of the present invention to provide a high-voltage through-type ceramic capacitor which is capable of permitting an insulation cover and/or an insulation case to exhibit good heat resistance.

It is a further object of the present invention to provide a high-voltage through-type ceramic capacitor which is capable of facilitating mounting of an insulation cover and/or an insulation case with respect to a ground fitment.

It is still another object of the present invention to provide a high-voltage through-type ceramic capacitor which is capable of being positively small-sized while ensuring its satisfactory operation.

It is yet another object of the present invention to provide a high-voltage through-type ceramic capacitor which is capable of exhibiting satisfactory performance and durability while being small-sized.

It is still a further object of the present invention to provide a high-voltage through-type ceramic capacitor which is capable of being small-sized while ensuring its positive and easy assembling.

It is yet a further object of the present invention to provide a high-voltage through-type ceramic capacitor which is capable of exhibiting satisfactory durability while being small-sized.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like parts throughout; wherein:

FIGS. 11 and 12 each are a vertical sectional view showing another modification of the embodiment shown in FIG. 6;

FIGS. 15 and 16 each are a partially sectional view of the ceramic capacitor shown in FIG. 14;

FIGS. 17 and 18 each are a partially sectional view showing a modification of the embodiment shown in FIG. 14;

FIG. 20 is a graphical representation showing results of a dielectric strength test under moistening conditions carried out on each of a ceramic capacitor of the present invention and a conventional one.

DETAILED DESCRIPTION OF THE PREFERRED EMBODIMENTS

Now, a high-voltage through-type ceramic capacitor according to the present invention will be described hereinafter with reference to the accompanying drawings.

Figure 5:
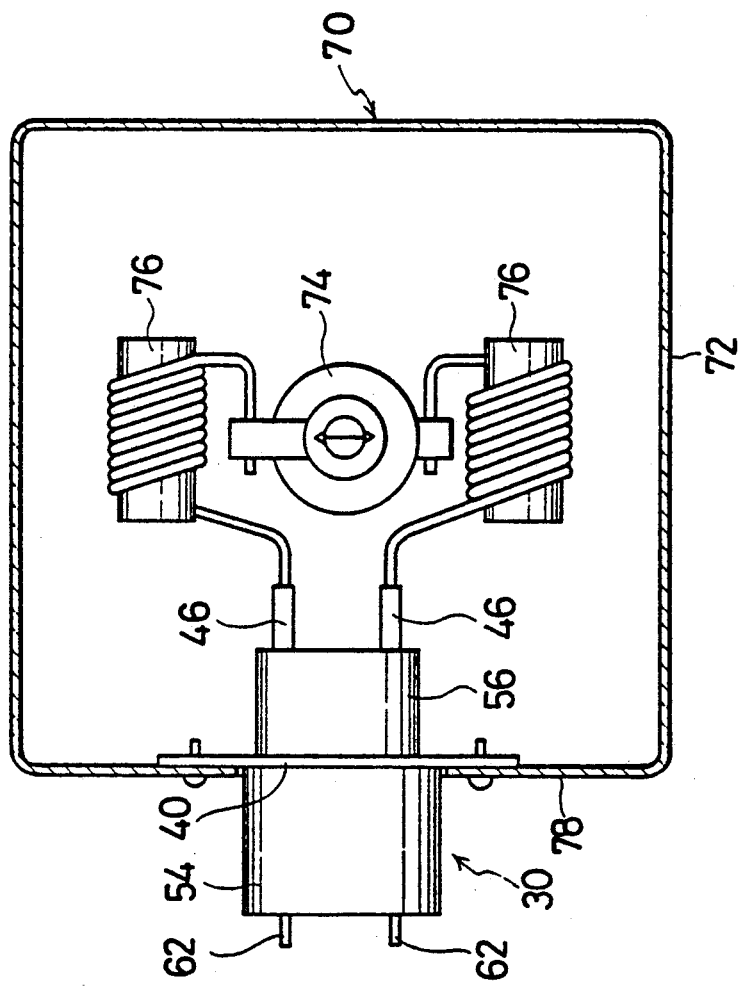
FIG. 5 is a plan view partly in section showing an embodiment of a high-voltage through-type ceramic capacitor according to the present invention.

FIG. 5 shows an embodiment of a high-voltage through-type ceramic capacitor according to the present invention which is mounted on a filter box. A high-voltage through-type ceramic capacitor of the illustrated embodiment generally indicated by reference numeral 30 is mounted on a filter box likewise generally indicated at reference numeral 70. The filter box 70 includes a casing 72, an aluminum stem 74 arranged at a central portion of the casing 72, and a pair of choke coils 76 arranged in the casing 72 in a manner to interpose the aluminum stem 74 therebetween. The aluminum stem 74 is connected through the choke coils 76 to central conductors 46. The ceramic capacitor 30 is fixedly mounted through a ground fitment 40 on a side wall 78 of the casing 72 by means of screws or rivets.

An insulation cover 56 is necessarily arranged in the filter box 70, resulting in being exposed to a high temperature as high as about 230° C. Thus, in the illustrated embodiment, the insulation cover 56 is formed of polyethylene terephthalate (PET) or nylon 66 so as to fully withstand the high temperature in the filter box, because PET and nylon 66 are about 250° to 260° C. and about 260° C. in melting point, respectively.

In the illustrated embodiment, it is preferable that an insulation case 54 is likewise made of PET or nylon 66, because this further improves heat resistance of the ceramic capacitor.

It is known that PET and nylon 66 each have an extension as high as several percents and an elasticity to a certain degree. It has been found that such properties of the materials facilitate mounting of the insulation cover 56 and insulation case 54 with respect to the ground fitment 40.

The remaining part of the illustrated embodiment may be constructed in substantially the same manner as the conventional ceramic capacitor described above.

In the illustrated embodiment, at least one of the insulation cover and insulation case is made of PET or nylon 66. Thus, hanging-down of the insulation cover and insulation case due to softening or melting is effectively prevented even when a temperature in the filter box is increased to as high as 230° C. Thus, it will be noted that the illustrated embodiment substantially eliminates the insulation failure and burning of the insulation cover and insulation case.

Also, although it would be considered that use of a thermosetting resin material or an inorganic material such as ceramics is used for the insulation cover and/or insulation case in order to improve their heat resistance, these materials unfortunately deteriorates workability in mounting of these components on the ground fitment because they fail to exhibit satisfactory elongation and elasticity. PET or nylon 66 for the insulation cover and insulation case eliminates the disadvantage encountered with the thermosetting resin and inorganic material.

Figure 1:
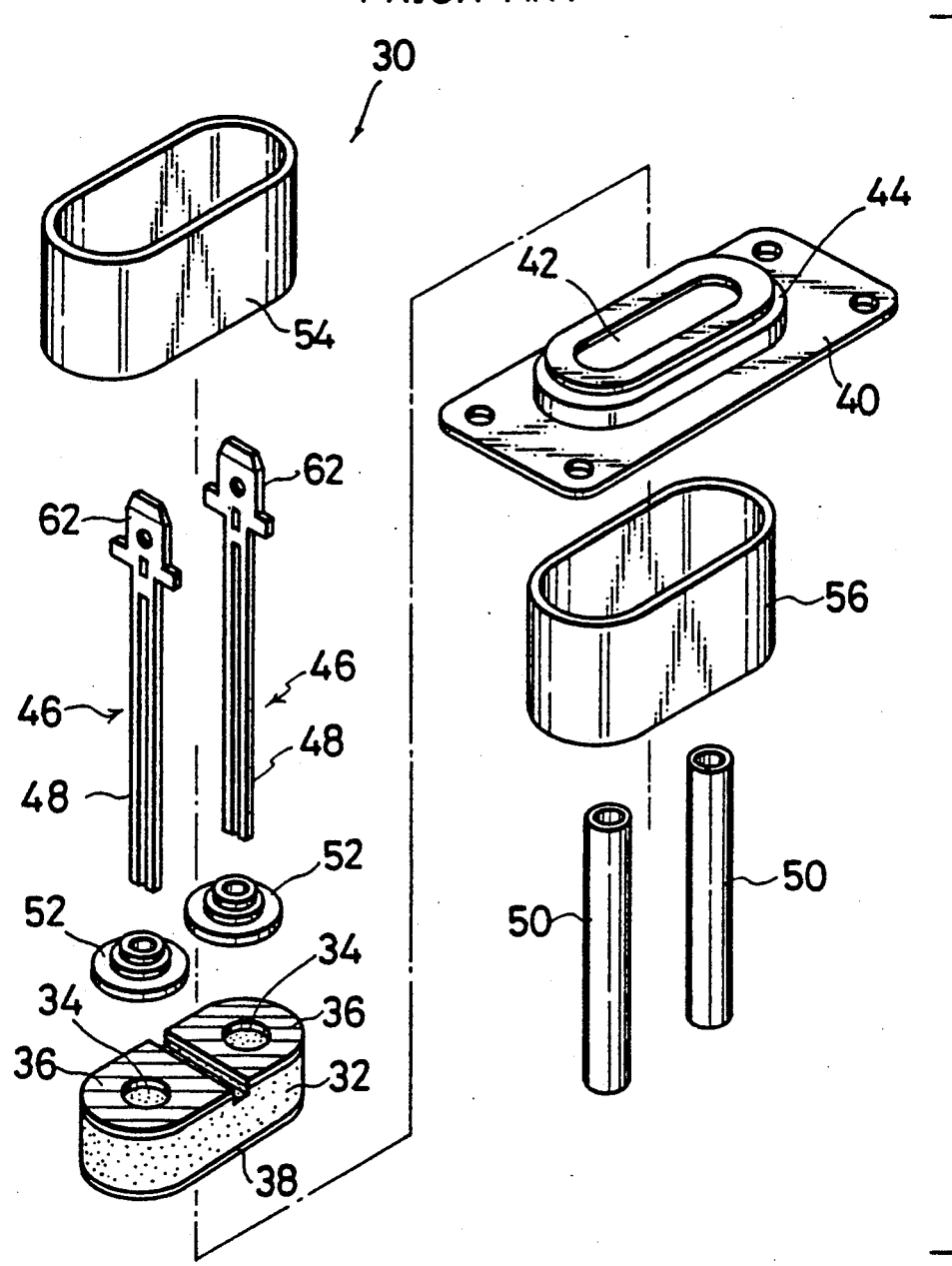
FIG. 1 is an exploded perspective view showing a conventional high-voltage through-type ceramic capacitor.
Figure 2:
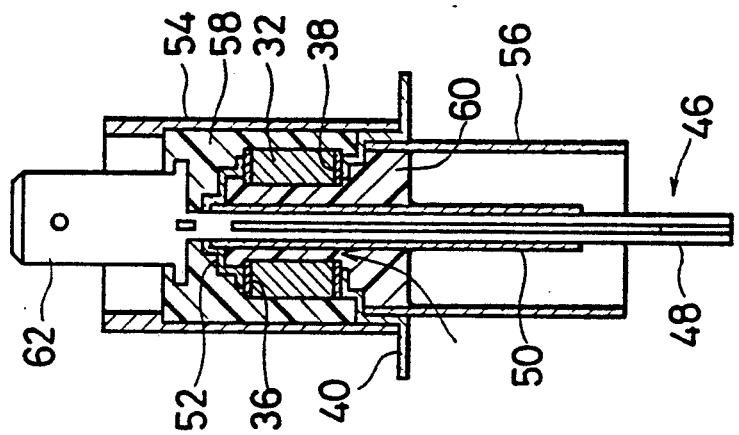
FIGS. 2 and 3 each are a vertical sectional view of the conventional ceramic capacitor shown in FIG. 1.
Figure 3:
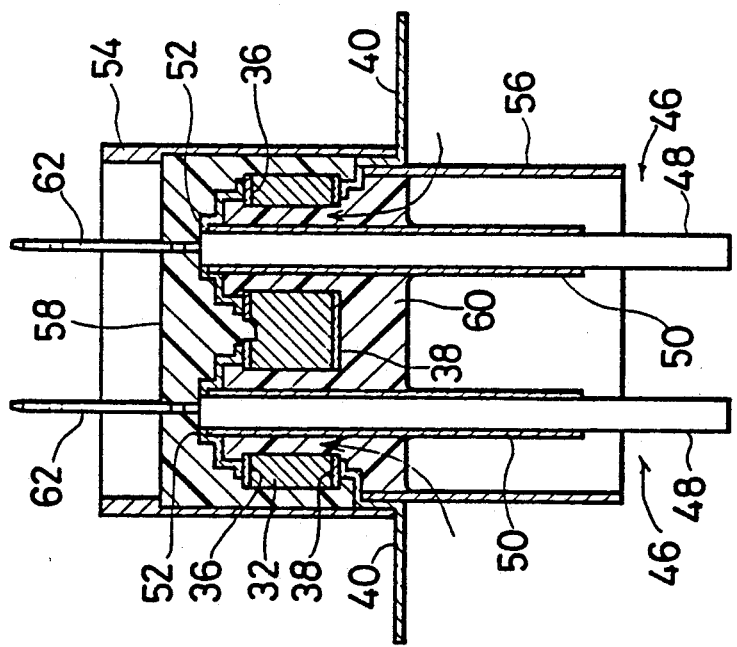
Figure 4:
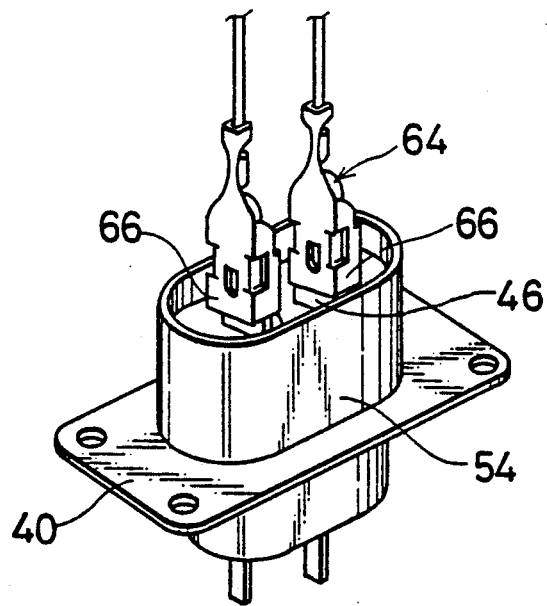
FIG. 4 is a fragmentary perspective view of the conventional ceramic capacitor on which receptacles are fitted.
Figure 6:
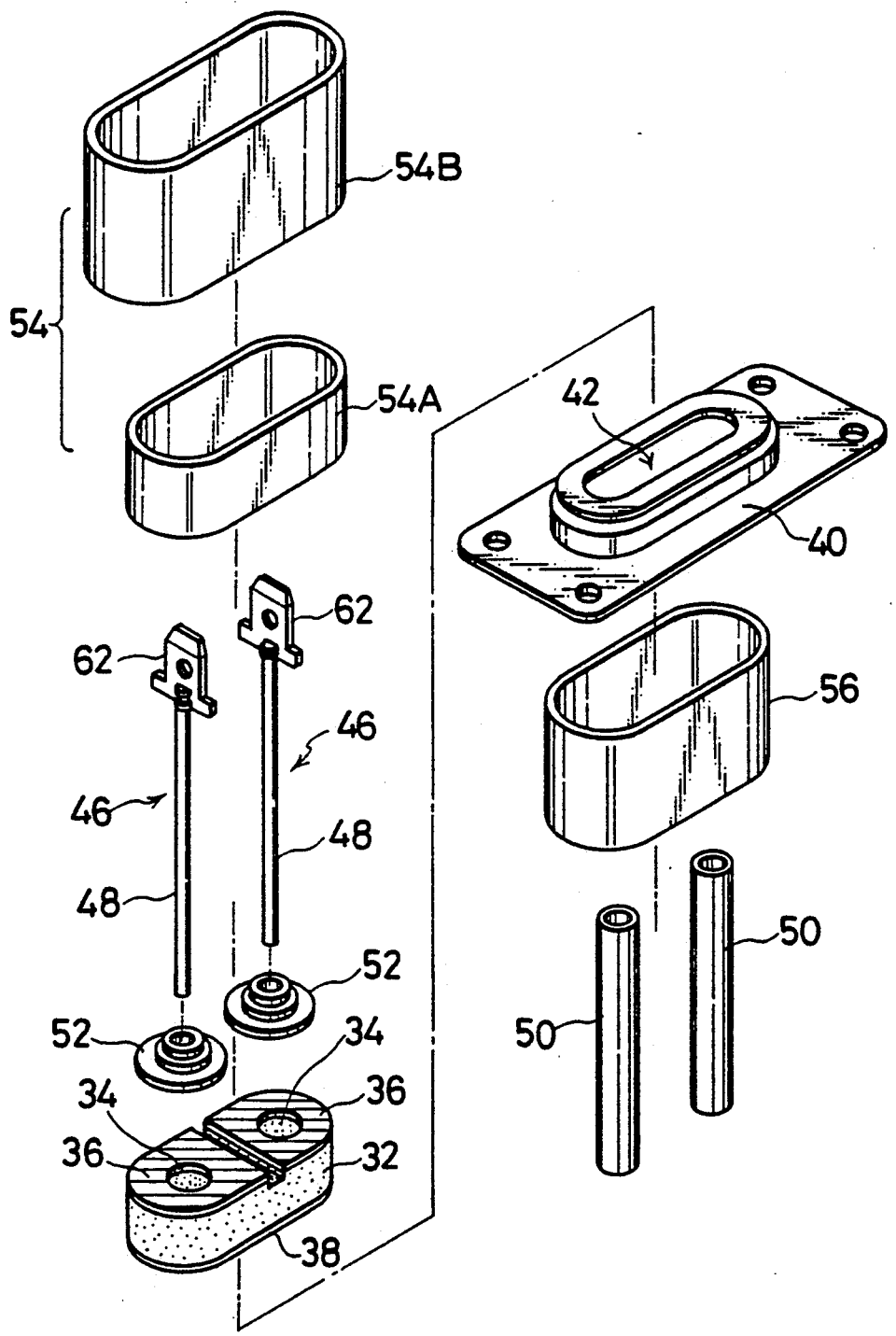
FIG. 6 is an exploded perspective view showing another embodiment of a high-voltage through-type ceramic capacitor according to the present invention.
Figure 7:
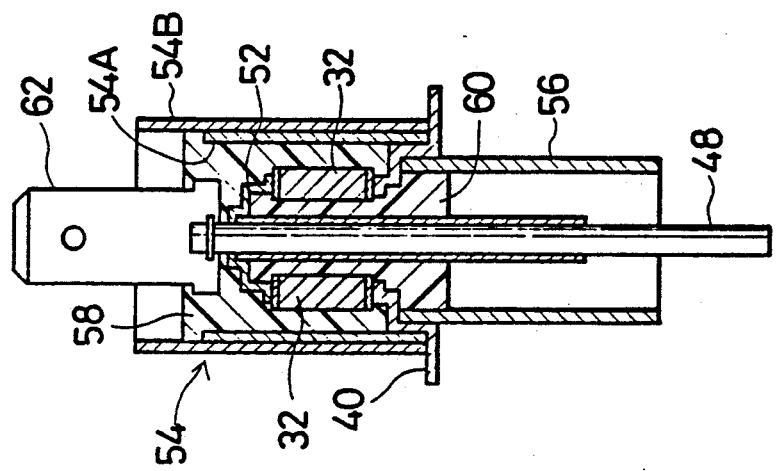
FIGS. 7 and 8 each are a vertical sectional view of the ceramic capacitor shown in FIG. 6.
Figure 8:
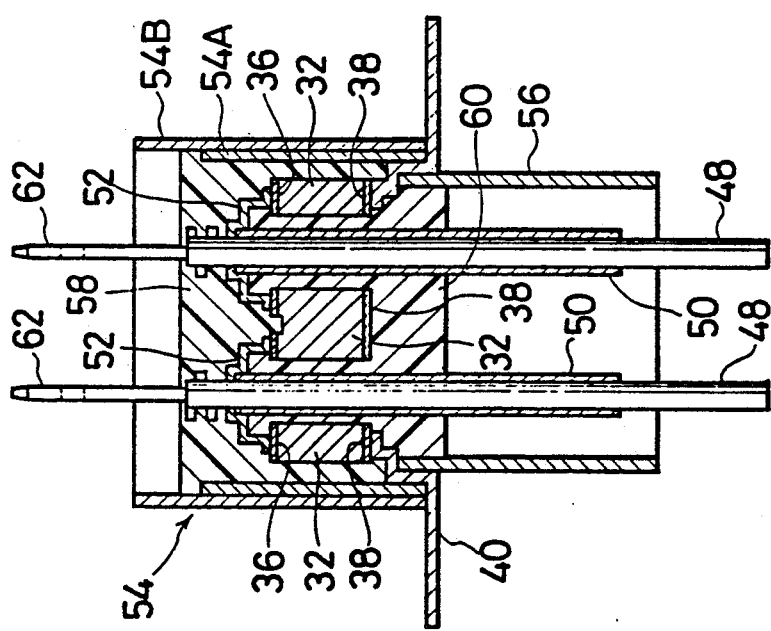

FIGS. 6 to 8 illustrate another embodiment of a high-voltage through-type ceramic capacitor according to the present invention. In the illustrated embodiment, an insulation case 54 is constituted by an inner case member 54A and an outer case member 54B. The inner case member 54A and outer case member 54B are formed into a configuration so that the inner case member 54A may be snugly fitted in the outer case member 54B. In the illustrated embodiment, the insulation case 54 is formed into an elliptic shape. Both case members 54A and 54B may be formed of PET or nylon 66. However, the inner case member 54A may be formed of a thermoplastic resin material and the outer case member 548 may be formed of a thermosetting resin material. Also, in the illustrated embodiment, the inner case member 54A is formed into a height smaller than that of the outer case member 548 and fitted in the outer case member 54B in such a manner that an upper end of the inner case member 54A terminates below that of the outer case member 54B. A portion of the insulation case 54 constituted by both inner and outer case member may be formed into substantially the same thickness as the conventional insulation casing as shown in FIG. 1. Thus, the above-described construction of the insulation case 54 in the illustrated embodiment permits an upper portion of the insulation case 54 constituted by only the outer case member 54B to be decreased in thickness by a dimension corresponding to a thickness of the inner case member 54A, resulting in the upper portion of the insulation case 54 being enlarged while ensuring rigidity and strength of the case 54. The inner case member 54A may be arranged or fitted in the outer case member 54B in such a manner that a lower end of the member 54A is aligned with that of the member 54B as shown in FIGS. 7 and 8.

As described above, the inner case member 54A may be made of a thermoplastic resin material such as polypropylene resin, polybutylene terephthalate (PBT) resin or the like, and the outer case member 54B may be made of a thermosetting resin material such as unsaturated polyester resin, epoxy resin, melamine resin, diallyl phthalate or the like.

The remaining part of the embodiment may be constructed in substantially the same manner as the conventional ceramic capacitor described above.

Figure 9:
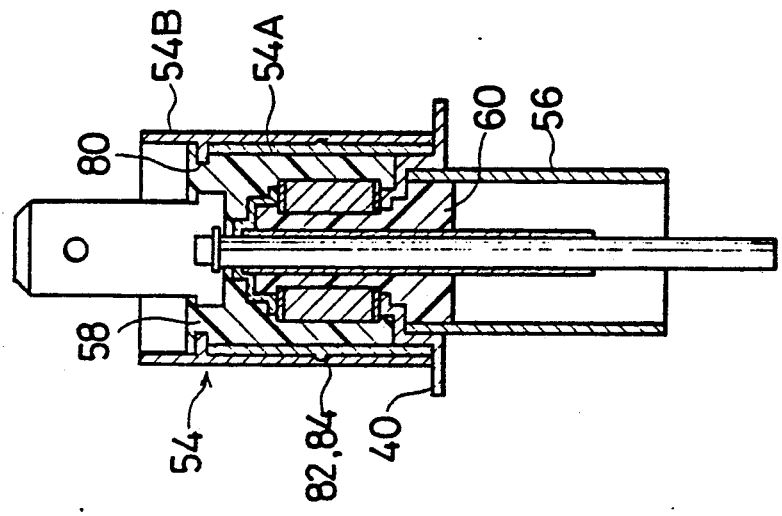
FIGS. 9 and 10 each are a vertical sectional view showing a modification of the embodiment shown in FIG. 6.
Figure 10:
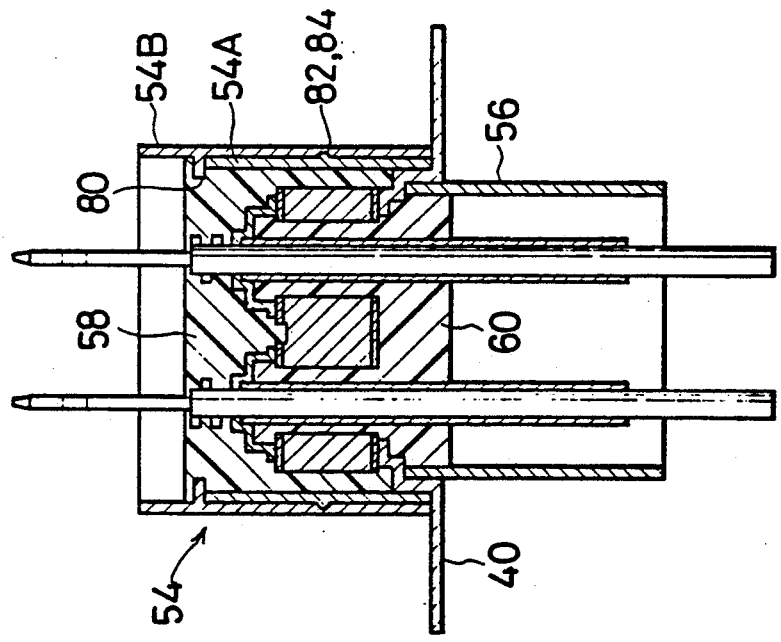

FIGS. 9 and 10 show a modification of the embodiment described above with reference to FIGS. 6 to 8. In the modification, an outer case member 54B is provided on an inner surface with an annular collar 80 horizontally positioned at a predetermined height. The collar 80 is closely contacted with an upper end of an inner case member 54A when the inner case member 54A is fitted in the outer case member 54B for assembling an insulation case 54, to thereby prevent an insulating resin material 58 poured in a molten state into the insulation case 54 from leaking through a gap between the inner case member 54A and the outer case member 54B to an exterior of the insulation case 54.

Also, in the modification, positioning means may be provided at the inner and outer case members 54A and 54B in order to carry out positive positioning of both case members relative to each other without any dislocation therebetween. In the modification, the positioning means comprises a combination of a projection 82 and a recess 84 formed at portions of both case members opposite to each other so as to positionally correspond to each other.

FIGS. 11 and 12 show another modification of the embodiment shown in FIGS. 6 to 8. A ceramic capacitor of the modification, an annular collar 80 is formed into a substantially sideways L-shape so as to envelop or surround an upper end of an inner case member 54A therein, resulting in more effectively preventing leakage of a resin material 58.

The remaining part of each of the modifications shown in FIGS. 9 to 12 may be constructed in substantially the same manner as the embodiment of FIGS. 6 to 8.

Figure 13:
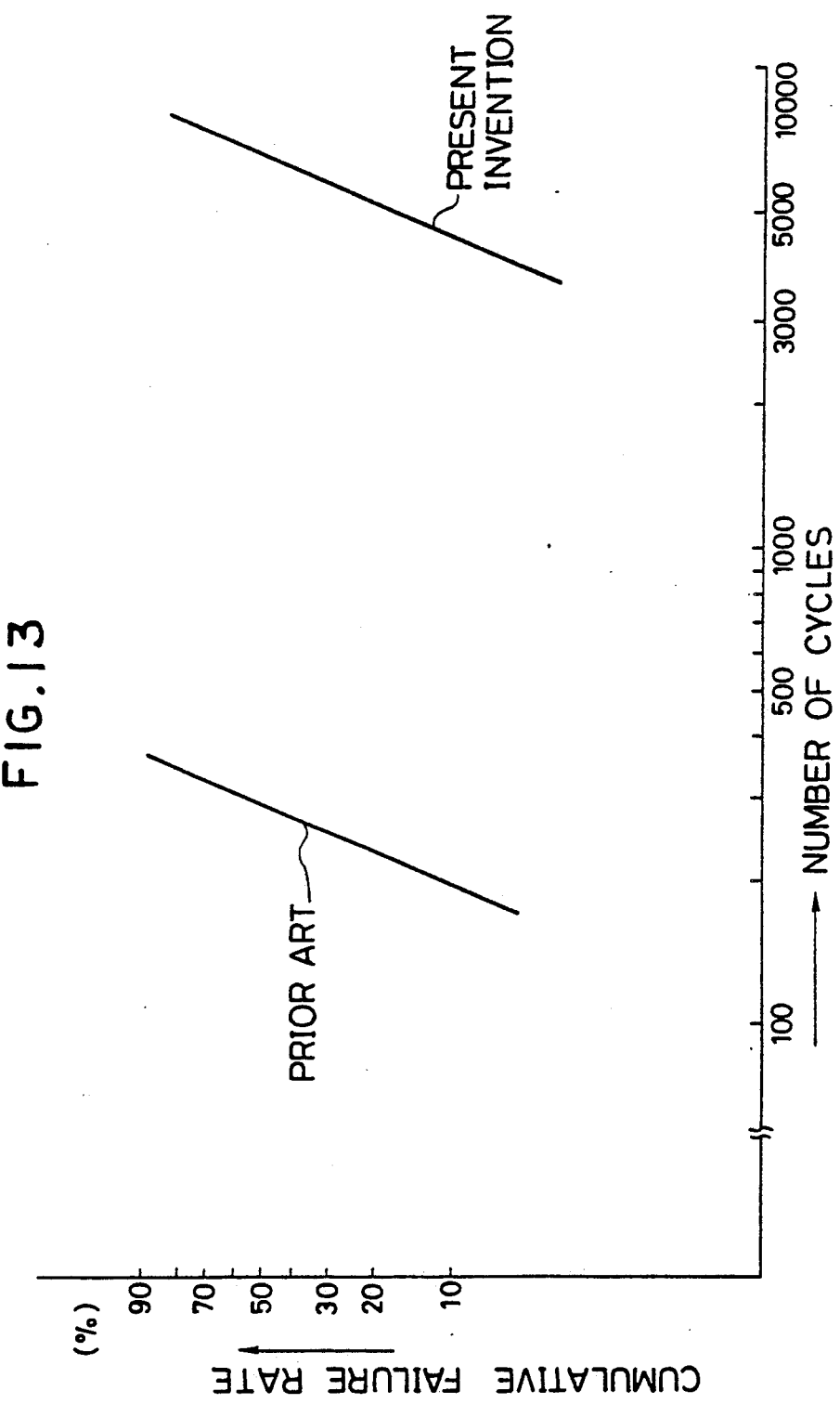
FIG. 13 is a graphical representation showing results of a dielectric strength test under moistening conditions carried out on each of a ceramic capacitor of the present invention and a conventional one.

FIG. 13 shows results of a dielectric strength test under moistening conditions which took place with respect to several samples of each of the ceramic capacitor of the embodiment shown in FIGS. 6 to 8 and the conventional ceramic capacitor of FIG. 1. The test was carried out by subjecting each of the samples to continuous moistening by means of an ultrasonic humudifier, connecting the sample to a high-voltage transformer of an electronic oven and intermittently applying a voltage thereto by an on-off control action, to thereby measure the number of cycles at which the sample is broken down, resulting in determining relationships between the number of cycles and a cumulative failure rate of the sample.

As is apparent from FIG. 13, the ceramic capacitor of the embodiment is highly improved in humidity resistance and dielectric strength under moistening conditions as compared with the conventional through-type ceramic capacitor.

As can be seen from the foregoing, the embodiment shown in FIGS. 8 to 12 is so constructed that the insulation case is constituted by the inner case member made of a thermoplastic resin material and the outer case member made of a thermosetting resin material and the inner case member is formed into a height smaller than that of the outer case member to cause the upper end of the inner case member to terminate at a position below that of the outer case, resulting the upper portion of the insulation case being significantly enlarged. This facilitates fitting of the receptacles on the fastening tabs to improve tracking resistance and arc resistance of the ceramic capacitor to a degree sufficient to highly increase its durability. Also, formation of the inner case member by a thermoplastic resin material substantially prevents adhesion between an inner surface of the inner case member and the insulation resin material received in the insulation case to improve dielectric strength of the capacitor. Further, arrangement of the annular collar on the inner surface of the outer case member effectively prevents leakage of the insulating resin material in a molten state.

Figure 14:
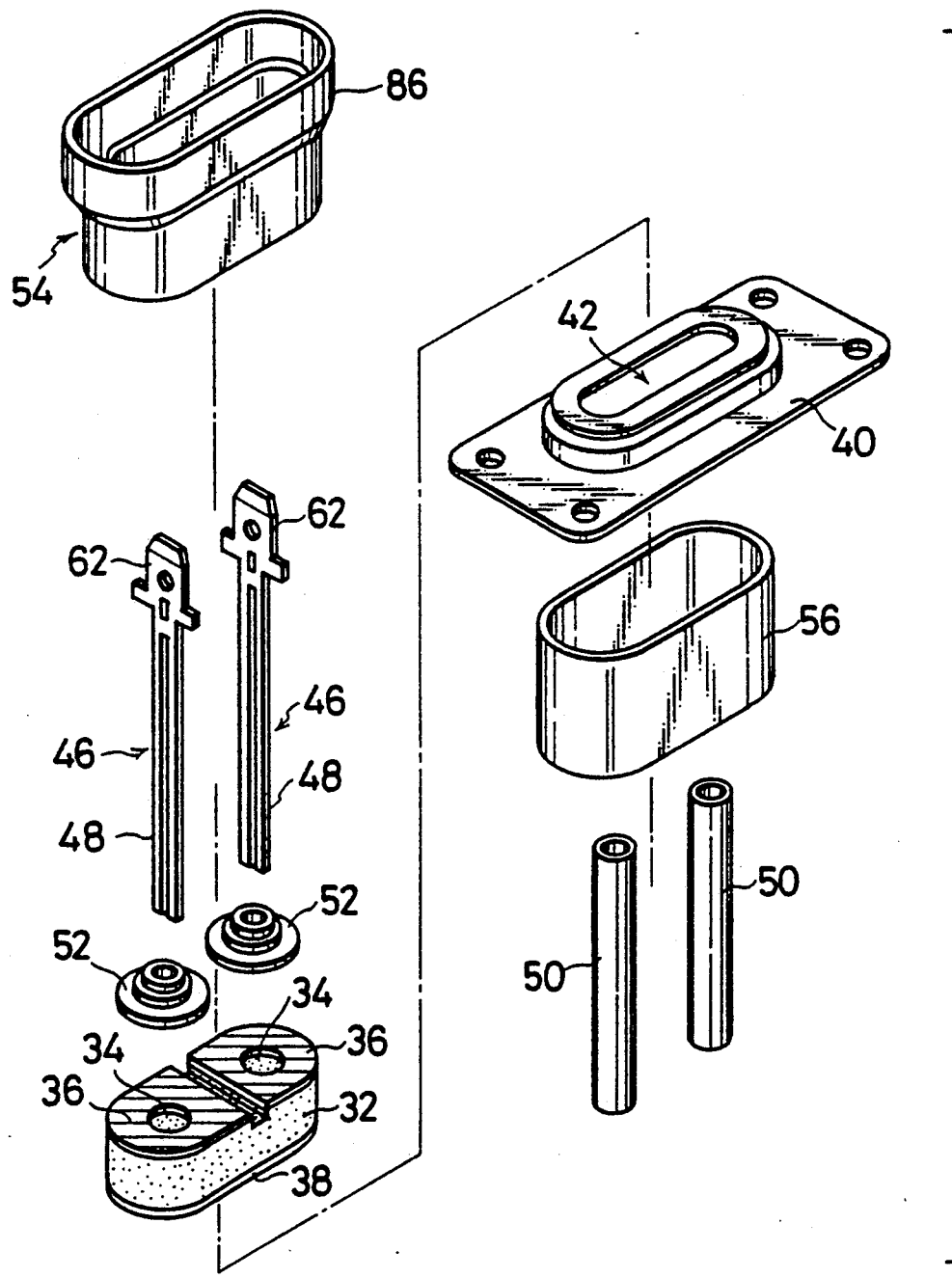
FIG. 14 is an exploded perspective view showing a further embodiment of a high-voltage through-type ceramic capacitor according to the present invention.

FIGS. 14 to 16 show a further embodiment of a high-voltage through-type ceramic capacitor according to the present invention.

In a ceramic capacitor shown in FIGS. 14 to 16, an insulation case 54 is enlarged at a portion thereof surrounding fastening tabs 62 to form an enlarged section 86.

More particularly, the insulation case 54 is formed into an elliptic shape in plan, and, as shown in FIGS. 15 and 16, the enlarged section 86 of the insulation cover 54 is enlarged at a larger diameter portion thereof by a distance of $2d_1$ and at a smaller diameter portion thereof by a distance of $2d_2$, so that a distance D between a fastening tab 62 and the insulation case 54 may be increased by $2d_1$ and $2d_2$ at the larger diameter and smaller diameter portions, respectively.

The remaining part of the illustrated embodiment may be constructed in substantially the same manner as the conventional ceramic capacitor as described above.

In the illustrated embodiment of FIGS. 14 to 16, the insulation case 54 may be wholly made of PET or nylon 66 in an integral manner. However, it may be made of a thermosetting resin material or a thermoplastic resin material. Further, the insulation case 54 may be made of different resin materials into two separate sections.

FIGS. 17 and 18 show a modification of the embodiment shown in FIGS. 14 to 16, wherein an insulation case 54 is made into two sections independent from each other. More particularly, the insulation case 54 includes an upper enlarged section 86 made of a thermosetting resin material and a lower section 88 made of a thermoplastic resin material, which are independent from each other. Then, the upper enlarged section 86 is fitted at a lower end portion thereof on an upper end portion of the lower section 88. The thermosetting resin material used for the enlarged section 86 includes unsaturated polyester resin, epoxy resin, melamine resin, diallyl phthalate resin and the like. The thermoplastic resin material for the lower section 88 includes polypropylene resin, PBT resin and the like.

Thus, in the modification, the lower section 88 which is a portion of the insulation case 54 substantially contacting with an insulating resin material 58 is formed of a thermoplastic resin material. Accordingly, the modification effectively eliminates a disadvantage encountered with an insulation case made of only a thermosetting resin material that the insulation case adheres to the insulating resin material to deteriorate dielectric strength of the capacitor. Also, in the modification, the upper enlarged section 86 is made of a thermosetting resin material, resulting in effectively preventing sagging of the section 86 due to heating to further improve dielectric strength of the capacitor.

Figure 19:
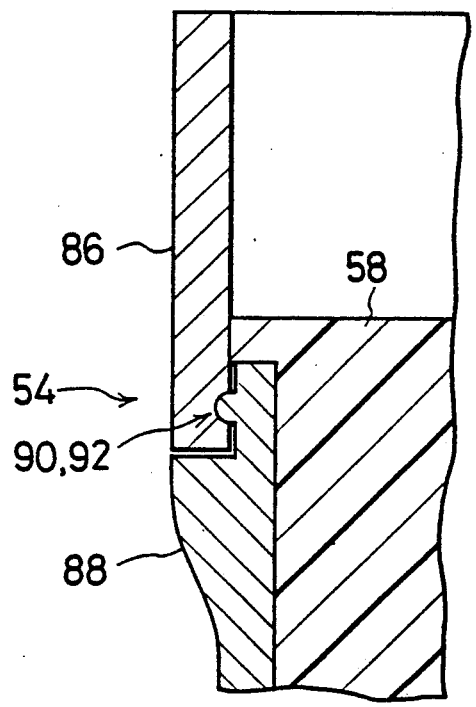
FIG. 19 is a fragmentary vertical sectional view showing positioning means.

The modification, as shown in FIG. 19, may include positioning means for carrying out positive positioning between the upper enlarged section 86 and the lower section 88 to facilitate fitting therebetween. In the modification, the positioning means comprises a combination of a projection 90 and a recess 92 provided on opposite side surfaces of the upper and lower section 86 and 88 contacting each other in a manner to positionally correspond to each other.

FIG. 20 shows results of a dielectric strength test under moistening conditions which took place with respect to several samples of each of the ceramic capacitor of the embodiment shown in FIGS. 14 to 16 and the conventional ceramic capacitor of FIG. 1. The test was carried out by subjecting each of the samples to continuous moistening by means of an ultrasonic humudifier, connecting the sample to a high-voltage transformer of an electronic oven and intermittently applying a voltage thereto by an on-off control action, to thereby measure the number of cycles at which the sample is broken down, resulting in determining relationships between the number of cycles and a cumulative failure rate of the sample.

As is apparent from FIG. 20, the ceramic capacitor of the embodiment is highly improved in humidity resistance and dielectric strength under moistening conditions as compared with the conventional through-type ceramic capacitor.

As can be seen from the foregoing, the embodiment shown in FIGS. 14 to 19, the upper portion or opening of the insulation case is likewise enlarged. Such construction facilitates fitting of the receptacles on the fastening tabs even when the insulation case is significantly small-sized, resulting in burning resistance and dielectric strength of the capacitor being highly improved and assembling of the capacitor being facilitated.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. In an improved high-voltage through-type ceramic capacitor, the improvement comprising:
   an insulation case;
   an insulation cover, the respective insulation case and cover extending over and jointly forming a housing unit for the capacitor, the insulation case having an upper outer perimeter of a size greater than any outer perimeter of the insulation cover;
   a ground fitment interposedly arranged between said insulation case and said insulation cover;
   a ceramic dielectric having earth electrode means connected to said ground fitment;
   a pair of central conductors each including a fastening tab arranged in said insulation case, and
   an insulating resin material poured in said insulation case so as to surround said ceramic dielectric, said insulation case being formed at a portion thereof surrounding said fastening tabs into an enlarged section.

2. An improved capacitor as defined in claim 1 wherein at last one of said insulation case and insulation cover is made of a material selected from the group consisting of polyethylene terephthalate and nylon 66.

3. An improved capacitor as defined in claim 1 wherein said insulation case comprises an inner case member and an outer case member fitted on said inner case member, said inner case member being formed into a height smaller than that of said outer case member and fitted in said outer case member in such a manner than an upper end of said inner case member terminates below an upper end of said outer case member, resulting in said upper enlarged section.

4. An improved capacitor as defined in claim 3, wherein said inner case member is made of a thermoplastic resin material and said outer case member is made of a thermosetting resin material.

5. An improved capacitor as defined in claim 3 wherein said outer case member is provided on an inner peripheral surface thereof with an annular collar, an upper end of said inner case member being abutted against said annular collar.

6. An improved high-voltage through-type ceramic capacitor of the type having a ground fitment interposed between an insulation cover and an insulation case, a ceramic dielectric having earth electrode means connected to the ground fitment, and a pair of central conductors arranged in the insulation case and surrounded by an insulation resin material, each central conductor including a fastening tab that extends from the insulation resin material so as to be surrounded by an end portion of the insulation case, the improvement comprising:
   the insulation case having a main body portion in addition to an upper end portion, each having predetermined internal dimensions, the internal dimensions of the upper end portion being enlarged relative to the internal dimensions of the main body portion.

7. The improved high-voltage through-type ceramic capacitor of claim 6 wherein the ground fitment has a central shoulder surrounding an opening, the insulator case extends over the central shoulder, and the insulation cover extends within the central shoulder.

8. The improved high-voltage through-type ceramic capacitor of claim 6 wherein at least one of the insulation case and the insulation cover are comprised of a material selected from the group consisting of polyethylene terephthalate and nylon 66.

9. The improved high-voltage through-type ceramic capacitor of claim 8 further comprising an insulation tube positioned over each of the central conductors to space them from insulation resin material.

* * * * *